US006453085B1

United States Patent
Ressl

(10) Patent No.: US 6,453,085 B1
(45) Date of Patent: Sep. 17, 2002

(54) SWITCHING SYSTEM WITH MEMS MODIFICATION OF A SIGNAL WAVEFRONT

(75) Inventor: Michael G. Ressl, Western Springs, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 188 days.

(21) Appl. No.: 09/686,330

(22) Filed: Oct. 11, 2000

(51) Int. Cl.$^7$ ................................................ G02B 6/26

(52) U.S. Cl. .............................. 385/18; 385/14; 385/37; 359/127; 359/298

(58) Field of Search .............................. 385/16, 18, 19, 385/31, 37, 14, 131, 89; 359/298, 299, 300, 124, 127, 130

(56) References Cited

U.S. PATENT DOCUMENTS

| 4,190,811 A | | 2/1980 | Alcock et al. | |
|---|---|---|---|---|
| 4,880,296 A | | 11/1989 | Ditman, Jr. | |
| 5,969,848 A | | 10/1999 | Lee et al. | |
| 6,121,983 A | * | 9/2000 | Fork et al. | 347/134 |
| 6,353,492 B2 | * | 3/2002 | McClelland et al. | 359/254 |
| 6,363,183 B1 | * | 3/2002 | Koh | 385/37 |
| 2002/0067888 A1 | * | 6/2002 | Morozov et al. | 385/37 |

FOREIGN PATENT DOCUMENTS

EP     0 254 509 A1    1/1988

* cited by examiner

Primary Examiner—Hemang Sanghavi
(74) Attorney, Agent, or Firm—Patton Boggs, LLP

(57) ABSTRACT

The switching system with MEMS modification of a signal wavefront implements a new type of all-optical signal switching element that uses the coherence properties of electromagnetic radiation, coupled with the materials properties of semiconductors through the application of existing Micro-machined Electro-Mechanical System (MEMS) technology to provide signal switching apparatus that is faster in operation, smaller in size, more robust, and less expensive than existing signal switching elements found in all-optical communication switching systems. This is accomplished by the use of a semiconductor chip that has a MEMS mirror system implemented on its face. The MEMS device is constructed to operate in a pure materials flex mode, with no moving mechanical parts to wear. The MEMS mirror system is used to create local distortions in the reflected and/or transmitted electromagnetic radiation wavefront to redirect the electromagnetic radiation in such a way as to create channels of changed resistance in a bulk semiconductor. These changes in resistance to the channels serve to enhance or impede the motility of electrons through the bulk semiconductor, thereby providing a switching function within the bulk semiconductor. Alternatively, the redirection of the electromagnetic radiation wavefront can be effected via changes in the index of refraction in the bulk semiconductor material.

14 Claims, 3 Drawing Sheets

SWITCHING SYSTEM WITH MEMS MODIFICATION OF A SIGNAL WAVEFRONT

FIELD OF THE INVENTION

This invention relates to communication switching systems and an optically based switching element that uses MEMS modification of the electromagnetic radiation signal wavefront to effect the signal switching function.

PROBLEM

It is a problem in the field of communication switching systems to provide signal switching apparatus that is faster in operation, smaller in size, more robust, and less expensive than the signal switching apparatus presently used in existing communication switching systems. The state of the art in existing communication switching systems is the use of transistor based signal switching elements to implement electronic switching of the received electrical signals. These transistor based signal switching elements receive the electrical signals that represent the communication signal from an input port and then redirect these electrical signals to a selected one of a plurality of output ports. The interconnection of the input and selected output ports is effected in a manner that the electrical signals may be transmitted in unmodified form.

As optical signal transmission elements are propagated into these communication switching systems, the need to convert the optical signals to electrical signals and back again to implement the signal switching function represents a significant inefficiency in the operation of these systems. Since most communication connections require many stages of switching, the seriatim conversion between electrical and optical format of the communication signals reduces the benefits provided by the optical transmission of the communication signals. An alternative to the signal conversion paradigm is to provide an all-optical communication switching system. However, the signal switching elements used in existing all-optical communication switching systems suffer from a number of problems, including but not limited to: lack of speed, materials related issues, limited scaling potential, and the like. Therefore, there is presently no signal switching element in all-optical communication switching systems that can efficiently compete with transistor based signal switching elements, in spite of the limitations noted above.

SOLUTION

The above described problems are solved and a technical advance achieved by the present switching system with MEMS modification of a signal wavefront which implements a new type of all-optical signal switching element that uses the coherence properties of electromagnetic radiation, coupled with the materials properties of semiconductors through the application of existing Micro-machined Electro-Mechanical System (MEMS) technology to provide signal switching apparatus that is faster in operation, smaller in size, more robust, and less expensive than existing signal switching elements found in all-optical communication switching systems. This is accomplished by the use of a semiconductor chip that has a MEMS mirror system implemented on its face. The MEMS device is constructed to operate in a pure materials flex mode, with no moving mechanical parts to wear. The MEMS mirror system is used to create local distortions in the reflected and/or transmitted electromagnetic radiation wavefront to redirect the electromagnetic radiation in such a way as to create channels of changed resistance or index of refraction in a bulk semiconductor. These changes in resistance to the channels serve to enhance or impede the motility of electrons through the bulk semiconductor, thereby providing an electrical switching function within the bulk semiconductor. Alternatively, the redirection of the input electromagnetic radiation wavefront can be effected via changes in the index of refraction in the bulk semiconductor material.

In this system, the coherent electromagnetic radiation (such as a beam of light) from a source is split into two beams: a reference beam and an object beam. The object beam is directed at the surface of a semiconductor wafer that has been modified to create a plurality of MEMS surfaces whose position can be altered through the application of a suitable voltage to the semiconductor wafer. The application of this voltage alters the position of the surface of the selected MEMS device with respect to the semiconductor wafer by either tilting the surface of the MEMS device or by vertically repositioning the surface of the MEMS device relative to the semiconductor wafer. This repositioning of the selected MEMS device imparts a phase front delay and possibly an intensity modulation of the redirected wavefront that travels in certain directions on the portion of the electromagnetic radiation wavefront of the object beam that is transmitted through or reflected from the surface of the MEMS device relative to the reference beam of the original signal. The phase front modified object beam is used to either interact with the reference beam in the volume immediately above or below the MEMS surface, as is typical in reflection holography or alternately is combined with the reference beam as is typical in transmission holography. In either case a controllable, three dimensional, volume spatial fringe pattern is formed due to the variation in the two beams introduced by the operation of the MEMS device. The volume spatial fringe pattern is made up of one or more spatial volumes that can be used in one application to create the channels of changed resistance in a bulk semiconductor.

DETAILED DESCRIPTION

The present switching system with MEMS modification of a electromagnetic radiation signal wavefront makes use of a semiconductor chip that has a MEMS mirror system implemented on its face that is used to create local distortions in the reflected and/or transmitted electromagnetic radiation wavefront to redirect the electromagnetic radiation in such a way as to create channels of changed resistance in a bulk semiconductor. A typical bulk semiconductor material used for this purpose is GaAs. These changes in resistance to the channels serve to enhance or impede the motility of electrons through the bulk semiconductor, thereby providing a switching function within the bulk semiconductor. Alternatively, the redirection of the electromagnetic radiation wavefront can be effected via changes in the index of refraction in the bulk semiconductor material. The redirected electromagnetic radiation wavefront can be directed to a designated destination, such as to a bulk semiconductor, to create channels of changed resistance in the bulk semiconductor. These changes in resistance to the channels serve to enhance or impede the motility of electrons through the bulk semiconductor, thereby providing a switching function within the bulk semiconductor. The changes in the index of refraction can be used in multiple dimensions to switch among various target areas.

SYSTEM ARCHITECTURE

Figure 1:
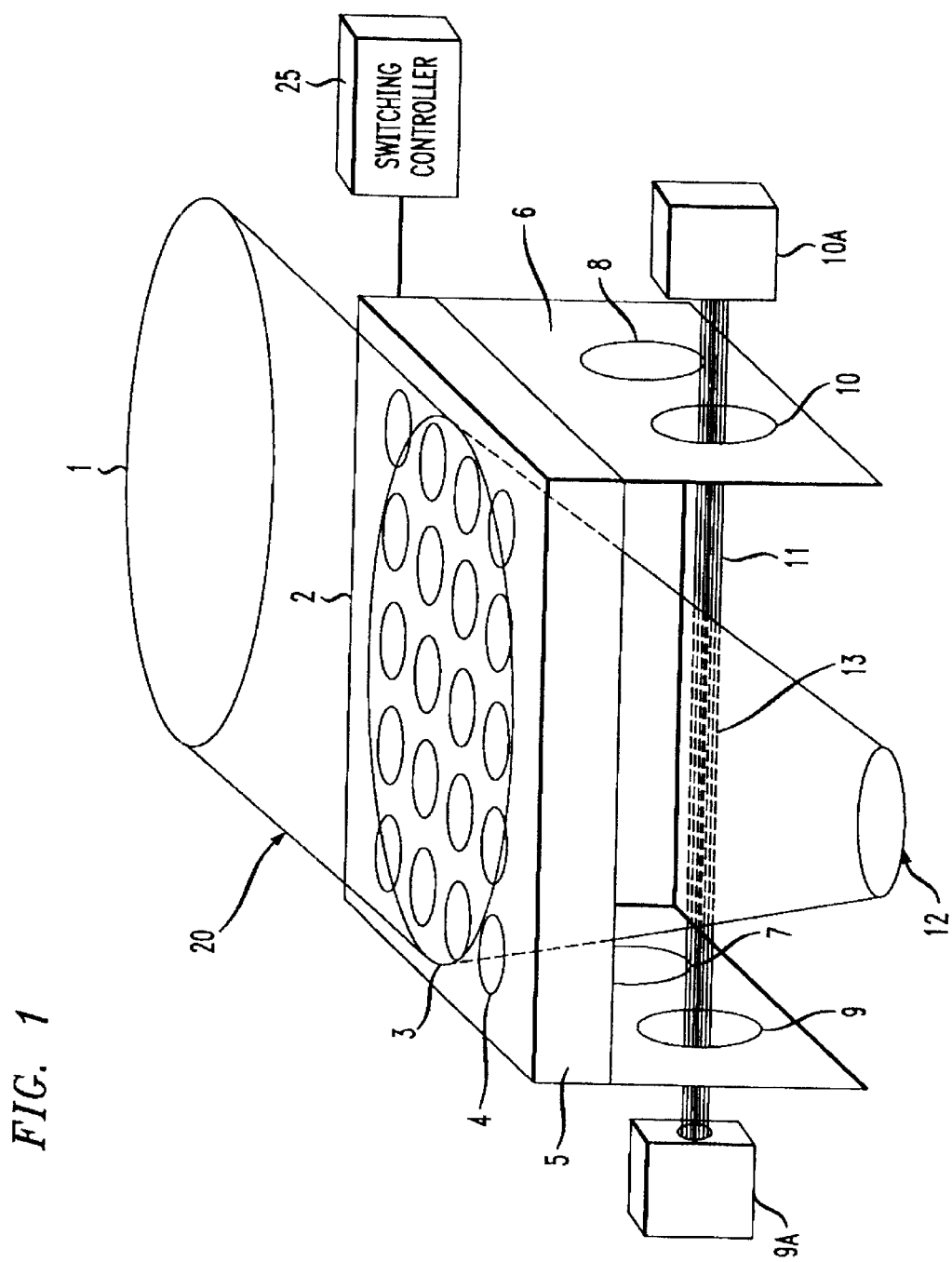
FIG. 1 illustrates a perspective view of the overall architecture of the present switching system with MEMS modification of a signal wavefront which uses a transmission holography mode of operation.
Figure 2:
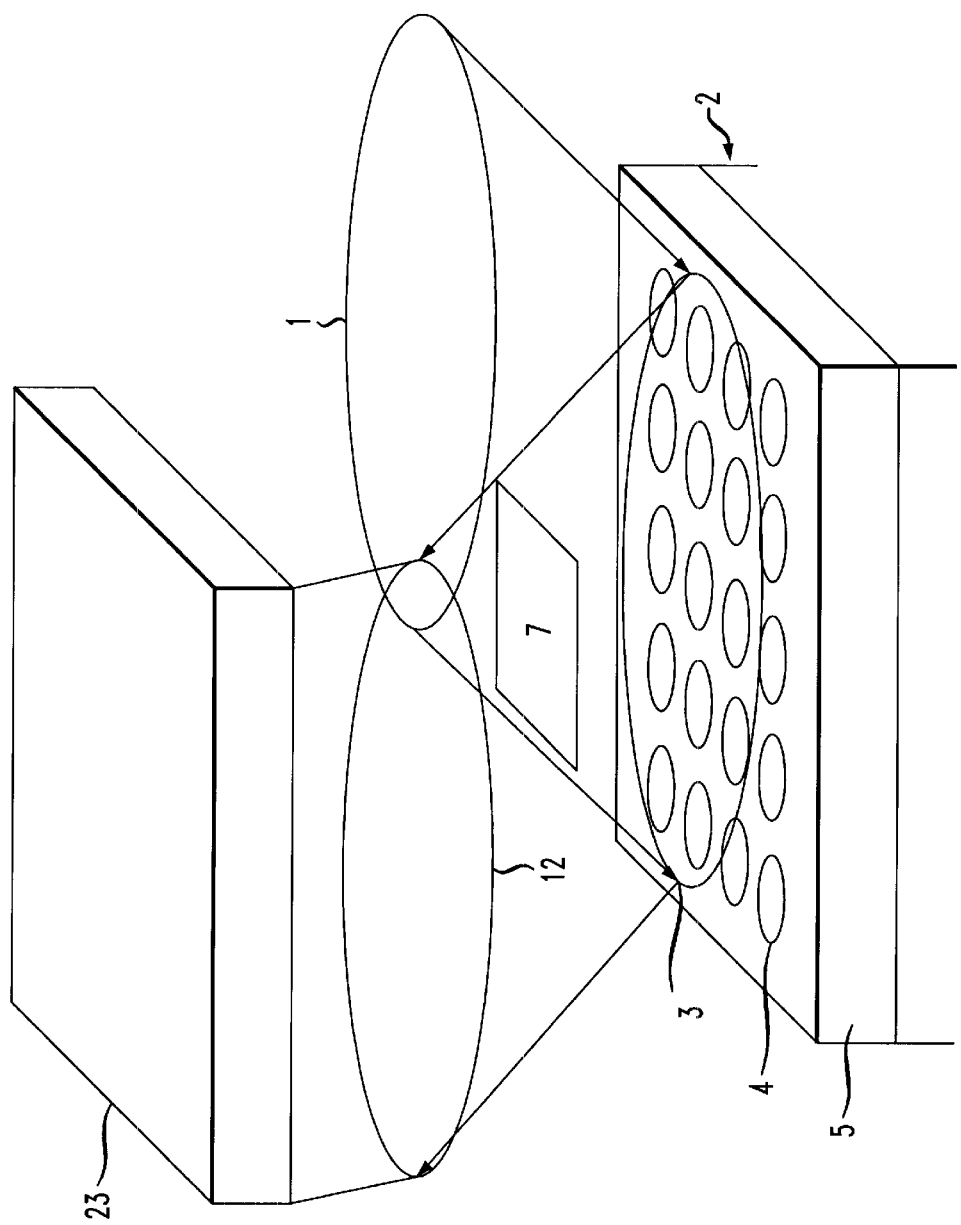
FIG. 2 illustrates a perspective view of the overall architecture of the present switching system with MEMS modification of a signal wavefront which uses a reflection holography mode of operation.

FIG. 1 illustrates a perspective view of the overall architecture of the present switching system with MEMS modification of a signal wavefront which uses a transmission holography mode of operation, while FIG. 2 illustrates a perspective view of the overall architecture of the present switching system with MEMS modification of a signal wavefront which uses a reflection holography mode of operation. In these figures, the incident electromagnetic radiation wavefront 1 is shown as being transmitted from a source (not shown) through the area 20 above the device 2 to produce a wavefront spot 3 (also termed illuminated area) on device 2. The device 2 comprises a bulk semiconductor material 6 that has formed on a surface thereof a substrate 5 on which a plurality of individual MEMS mirrors 4 have been formed. The individual MEMS devices 4 are connected to a switching controller 25 which regulates the operation of the plurality of MEMS devices 4. In FIG. 1 the MEMS modification of a signal wavefront which uses a transmission holography mode of operation is shown and the bulk semiconductor material 6 is an optical material in which a plurality of ports 7–10 are formed, with unconnected ports 7,8 and ports 9,10, connected to each other by a channel 11 activated in the bulk semiconductor material 6 and each respectively connected to an interface device 9A, 10A, are shown.

In FIG. 2 the MEMS modification of a signal wavefront which uses a reflection holography mode of operation is shown and the plurality of individual MEMS mirrors 4 formed on substrate 5 of device 2 reflect the incident electromagnetic radiation wavefront 1 to form an output electromagnetic radiation wavefront 12 which is directed in a predetermined direction so as to create an appropriate overlap with electromagnetic radiation wavefront 1 within target bulk semiconductor 23. In both embodiments shown above, the wavefront spot 3 is of extent to illuminate a plurality of individual MEMS mirrors 4, so that the switching function described below can entail the operation of more than one of the plurality of the individual MEMS mirrors 4, or a single one of the plurality of individual MEMS mirrors 4.

Figure 3:
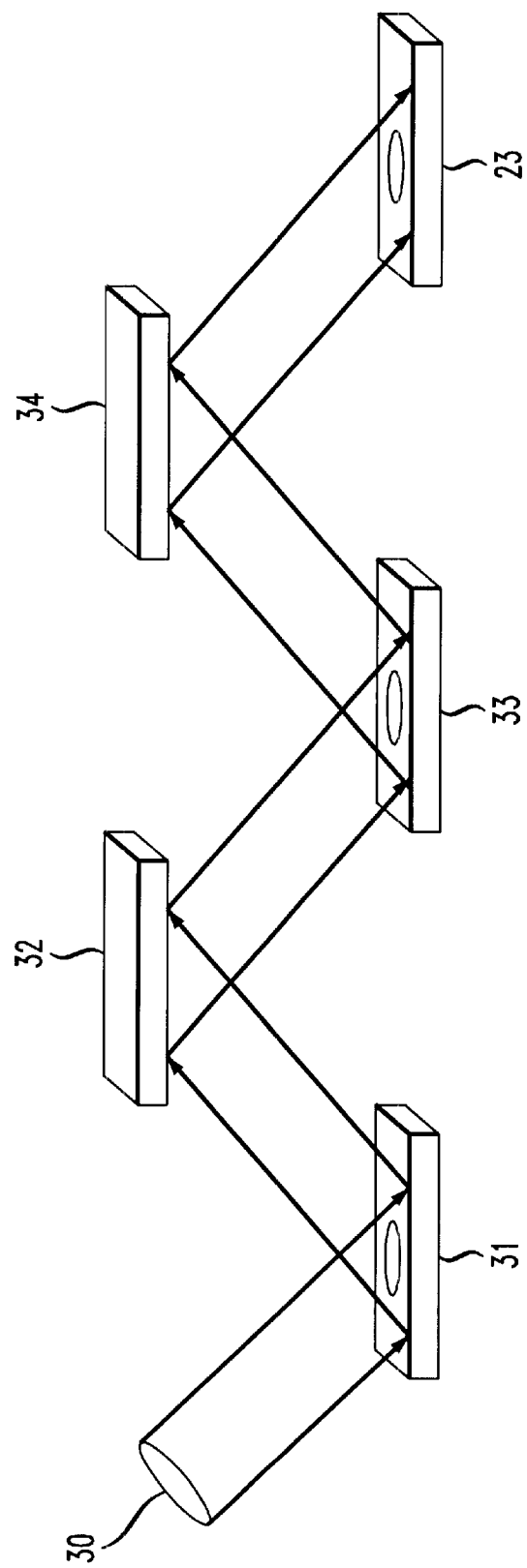
FIG. 3 illustrates one embodiment of a reflection-based cascaded switching element version of the system of FIG. 2.

In this system, the coherent electromagnetic radiation from a source is split into two beams: a reference beam and an object beam. The object beam is directed at the surface of device 2 which includes a substrate 5 that has been modified to create a plurality of MEMS surfaces 4 whose position can be altered through the application of a suitable voltage to the device 2. The application of this voltage alters the position of the surface of the selected MEMS device 4 with respect to the substrate 5 by either tilting or rotating the surface of the MEMS device 4 or by vertically repositioning the surface of the MEMS device 4 relative to the substrate 5. This repositioning of the selected MEMS device 4 imparts a phase front delay on the portion of the electromagnetic radiation wavefront of the object beam that is transmitted through or reflected from the surface of the device 2 relative to the reference beam. The phase front modified object beam is used to either interact with the reference beam in the volume immediately above or below the MEMS surface, as is typical in reflection holography shown in FIG. 2 or alternately is combined with the reference beam along path 12 in FIG. 1 as is typical in transmission holography as shown in FIG. 1. In either case a controllable, three dimensional, volume spatial fringe pattern is formed. The volume spatial fringe pattern is made up of one or more spatial volumes 13 that create the channels 11 of changed resistance in a bulk semiconductor 6 in the system of FIG. 1 or the region 7 of spatial fringe pattern located above the surface of the device 2 in the system of FIG. 2. FIG. 3 illustrates one embodiment of a reflection-based cascaded switching element version of the system of FIG. 2, where a plurality of the devices 2 are arranged in an array, one dimension of which is illustrated in the interest of simplicity of description. In particular, a plurality of switching elements 31–34, each of which uses the MEMS modification of a signal wavefront by a reflection holography mode of operation as is shown in FIG. 2. The incident wavefront 30 is directed on a first MEMS element 31, and the angle of the MEMS element 31 is selected to reflect the incident object beam to impinge on the second MEMS element 32. Each of the intermediate mirrors 32–34 increase the spatial redirection of the incident object beam by two times the angle of reflection for each mirror, since the incident and output angles are the same. The mirror surfaces of each MEMS element 31–34 are typically coated with a highly reflective material, such as gold. The position of the MEMS devices 31–34 can be changed over time to provide time switching of the incident electromagnetic radiation signals, sending them to different destinations as they exit the array of MEMS elements 31–34. It is also obvious that the linear array of MEMS elements of FIG. 3 can be expanded to multidimensional arrays of MEMS elements, with the spatial redirection of the incident beam being controlled by electrically signals applied to each of the MEMS elements. Thus, the plurality of MEMS elements are cooperatively operative to direct the incident object beam to a desired destination.

Wavelength Multiplexing

The above described switching system with MEMS modification of a signal wavefront can use wavelength multiplexing and/or time multiplexing to accomplish the signal switching function. The use of multiple sources of electromagnetic radiation, each at different wavelength result in different volume spatial fringe patterns. This is due to the fact that different wavelengths of signal provide different phase fronts which can be used to control the creation of the volume spatial fringe patterns in the switching system with MEMS modification of a signal wavefront. Thus, the switching system with MEMS modification of a signal wavefront can code the incident signal by adding other wavelengths of electromagnetic radiation to the wavelength of the incident signal.

Furthermore, the channels that are created in the above-noted example of FIG. 1 can be partly in and partly above the bulk semiconductor material. For example, the MEMS devices can implement a diffraction grating where a portion of the incident electromagnetic radiation is passed through to the interior of the bulk semiconductor material as shown in FIG. 1 and a portion of the incident electromagnetic radiation is reflected from the surface of the MEMS device as shown in FIG. 2.

Overlapping and Spatially Divided Incident Beams

While the above-noted examples of FIGS. 1–3 illustrate a single incident beam of electromagnetic radiation, multiple overlapping incident beams of electromagnetic radiation can be concurrently processed. As shown in FIGS. 1 and 2, a plurality of the MEMS devices are illuminated by the incident beam of electromagnetic radiation. Various ones of the MEMS devices located within the wavefront spot 3 can be operated differently to redirect the incident beam of electromagnetic radiation to different destinations or to create different volume spatial fringe patterns for use in the bulk semiconductor material to create different channels of changed resistance in a bulk semiconductor. These various changes in resistance to the multiple channels serve to enhance or impede the motility of electrons through the bulk semiconductor, thereby providing a switching function within the bulk semiconductor for each of the channels targeted by the volume spatial fringe patterns.

Furthermore, the shape and extent of the volume spatial fringe patterns created can be regulated by the selection of the degree of operation of the MEMS device as well as the selection of the frequency of the modulation signal(s) added to the incident object beam and/or reference beam.

Summary

The semiconductor chip that has a MEMS mirror system implemented on its face creates local distortions in the reflected and/or transmitted electromagnetic radiation wavefront to redirect the electromagnetic radiation in such a way as to create channels of changed resistance in a bulk semiconductor. These changes in resistance to the channels serve to enhance or impede the motility of electrons through the bulk semiconductor, thereby providing a switching function within the bulk semiconductor. Alternatively, the redirection of the electromagnetic radiation wavefront can be effected via changes in the index of refraction in a target bulk semiconductor material.

What is claimed is:

1. A signal switching element that uses the coherence properties of electromagnetic radiation, coupled with the materials properties of semiconductors to provide signal switching for an incident beam of electromagnetic radiation, comprising:

semiconductor wafer means;

a plurality of operable MEMS means formed on a major surface of said semiconductor wafer means in a predetermined pattern; and switching controller means operably connected to said semiconductor wafer means for controlling the operation of said plurality of operable MEMS means, wherein said switching controller means alters a position of at least one of said plurality of operable MEMS means with respect to said major surface of said semiconductor wafer means to impart a phase front delay on a beam of electromagnetic radiation incident on said plurality of operable MEMS means.

2. The signal switching element of claim 1 wherein said plurality of operable MEMS means comprises:

MEMS orienting means for operating said plurality of operable MEMS means by at least one of: tilting the surface of the MEMS means, rotating the surface of the MEMS means relative to said major surface of said semiconductor wafer means, and by vertically repositioning the surface of the MEMS means relative to said major surface of said semiconductor wafer means.

3. The signal switching element of claim 1 wherein said switching controller means comprises:

means for generating a controllable, three dimensional, volume spatial fringe pattern by combining said phase front delayed beam of electromagnetic radiation and a portion of said incident beam of electromagnetic radiation.

4. The signal switching element of claim 3 wherein said switching controller means further comprises:

means for creating at least one channel of changed resistance in a bulk semiconductor.

5. The signal switching element of claim 1 further comprising:

beam splitting means for dividing coherent electromagnetic radiation from a source into two beams: a reference beam and an object beam.

6. The signal switching element of claim 5 further comprising:

means for directing said object beam at said plurality of MEMS means.

7. The signal switching element of claim 6 wherein said switching controller means comprises:

means for generating a controllable, three dimensional, volume spatial fringe pattern by combining said phase front delayed object beam of electromagnetic radiation and said reference beam of electromagnetic radiation.

8. A method of operating a signal switching element that uses the coherence properties of electromagnetic radiation, coupled with the materials properties of semiconductors to provide signal switching for an incident beam of electromagnetic radiation, that comprises a semiconductor wafer means having a plurality of operable MEMS devices formed on a major surface thereof in a predetermined pattern, said method comprising the steps of:

operably connecting a switching controller to said semiconductor wafer for controlling the operation of said plurality of operable MEMS devices;

altering a position of at least one of said plurality of operable MEMS devices with respect to said major surface of said semiconductor wafer means to impart a phase front delay on a beam of electromagnetic radiation incident on said plurality of operable MEMS devices.

9. The method of operating a signal switching element of claim 8 wherein said step of altering a position of at least one of said plurality of operable MEMS devices comprises:

orienting said plurality of operable MEMS devices by at least one of: tilting the surface of the MEMS devices, rotating the surface of the MEMS devices relative to said major surface of said semiconductor wafer means, and by vertically repositioning the surface of the MEMS devices relative to said major surface of said semiconductor wafer.

10. The method of operating a signal switching element of claim 8 wherein said step of altering a position of at least one of said plurality of operable MEMS devices comprises:

generating a controllable, three dimensional, volume spatial fringe pattern by combining said phase front delayed beam of electromagnetic radiation and a portion of said incident beam of electromagnetic radiation.

11. The method of operating a signal switching element of claim 10 wherein said step of altering a position of at least one of said plurality of operable MEMS devices comprises:

creating at least one channel of changed resistance in a bulk semiconductor.

12. The method of operating a signal switching element of claim 8 further comprising the step of:
   beam splitting by dividing coherent electromagnetic radiation from a source into two beams: a reference beam and an object beam.

13. The method of operating a signal switching element of claim 12 further comprising the step of:
   directing said object beam at said plurality of MEMS devices.

14. The method of operating a signal switching element of claim 13 wherein said step of altering a position of at least one of said plurality of operable MEMS devices comprises:
   generating a controllable, three dimensional, volume spatial fringe pattern by combining said phase front delayed object beam of electromagnetic radiation and said reference beam of electromagnetic radiation.

* * * * *